Patented Feb. 21, 1939

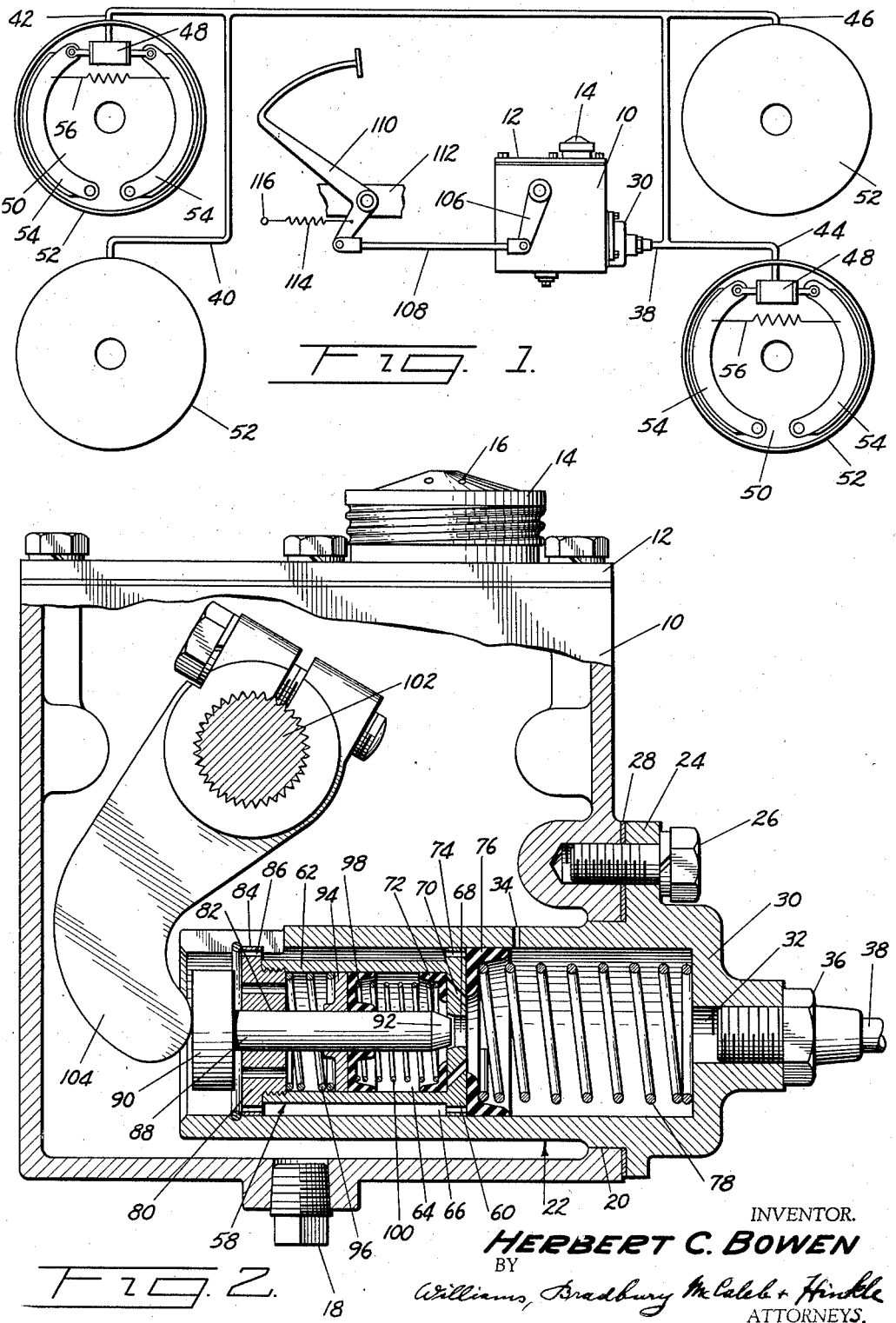

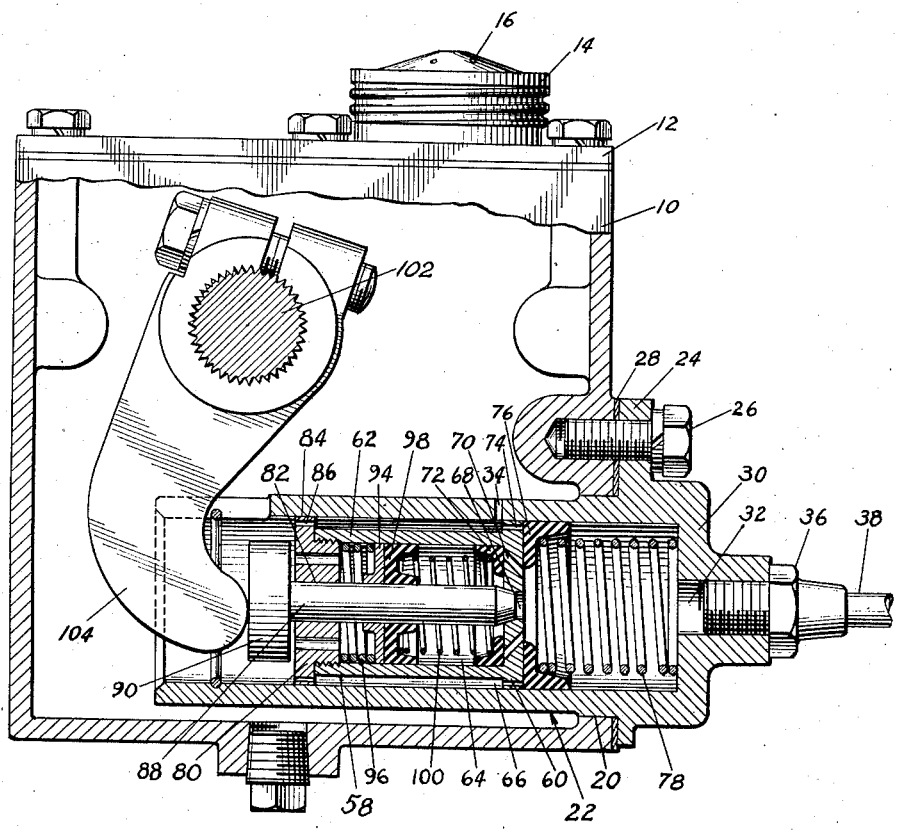

2,148,232

UNITED STATES PATENT OFFICE 2,148,232

FLUID PRESSURE BRAKING SYSTEM

Herbert C. Bowen, Detroit, Mich., assignor to Hydraulic Brake Company, Detroit, Mich., a corporation of California Application January 22, 1937, Serial No. 121,767

5 Claims. (Cl. 60—54.6)

This invention relates to fluid pressure braking systems for motor vehicles, and more particularly to fluid pressure producing devices for such systems.

An object of the invention is to provide a fluid pressure system including a pressure producing device operative to maintain the system free from air or gas bubbles.

Another object of the invention is to provide a fluid pressure system including a pressure producing device operative to overcharge the system at the conclusion of each operation thereof.

Another object of the invention is to provide a fluid pressure braking system including a manually operated fluid pressure producing device wherein the applied force for actuating the device may be cushioned so as to inhibit sudden applications of the brake.

A further object of the invention is to provide a fluid pressure system including a manually operated pressure producing device wherein a quantity of fluid, dependent upon the pressure created during the operation of the system, is metered to smooth out the operation of the system and stored so that it may be discharged into the system at the conclusion of each operation, to the end that the system may be maintained free from air or gas bubbles.

Other objects and structural details of the invention will be apparent from the subjoined description and accompanying drawings, in which—

Fig. 1 is a diagrammatical illustration of a fluid pressure braking system embodying the invention;

Fig. 2 is a vertical sectional view of the fluid pressure producing device; and

Fig. 3 is a vertical sectional view of the piston mechanism shown in Fig. 2, showing the parts in the position assumed during a compression stroke.

Referring to the drawings for more specific details of the invention, 10 represents a fluid reservoir having a removable top 12 provided with a filling opening which may be closed as by a cap 14 having suitable openings 16 for venting the reservoir to the atmosphere. The reservoir also has a drain opening in its bottom normally closed as by a plug 18, and arranged in the wall of the reservoir adjacent the bottom thereof is an opening 20.

A cylinder 22 fitted snugly in the opening 20 has a radial flange 24 secured to the wall of the reservoir as by bolts 26, and to provide against leakage of fluid from the reservoir past the cylinder a gasket 28 may be interposed between the flange and the reservoir. The flange serves to retain the cylinder against displacement and to support it in the reservoir in spaced parallel relation to and adjacent the bottom of the reservoir. The outer end of the cylinder is closed as by a head 30 provided with a discharge port 32, and the inner end of the cylinder is open and is in direct communication with the reservoir. The cylinder has in its wall a port 34 providing a communication between the cylinder and the reservoir so as to compensate for expansion and contraction of the fluid in the system due to temperature changes.

A coupling 36 connects the discharge port 32 of the cylinder to a fluid pressure delivery pipe or conduit 38 having branches 40, 42, 44 and 46 connected respectively to fluid pressure actuated motors 48 arranged in pairs, one pair for actuating the brakes associated with the front wheels of the vehicle and another pair for actuating the brakes associated with the rear wheels of the vehicle.

The brakes may be of conventional type. Preferably each of the brakes includes a fixed support or backing plate 50, a rotatable drum 52 associated therewith, a pair of corresponding interchangeable friction elements or shoes 54 pivoted on the backing plate, and a motor corresponding to the motors 48 mounted on the backing plate between the shoes and operative to move the shoes into engagement with the drum 52 against the resistance of a retractile spring 56 connected between the shoes.

A piston 58 reciprocable in the cylinder 22 is held against displacement by a conventional retaining ring seated in a groove in the wall of the cylinder. The retaining ring also serves to limit the retractile movement of the piston. As shown, the piston includes a head 60 and a hollow cylindrical skirt 62 of slightly reduced diameter providing a chamber 64 back of the head of the piston and also providing in conjunction with the wall of the cylinder 22 an annular chamber 66. The head 60 has an axial orifice or port 68 and a plurality of spaced ports 70 arranged in a circle, the center of which is in the axis of the piston, and inclined from the face of the piston toward the junction of the head and skirt.

The axial port 68 and the ports 70 in the head 60 of the piston provide communications between the chamber 64 and that portion of the cylinder forward of the piston. The axial port 68 is controlled by a plunger to be hereinafter described, and the ports 70 are controlled by a collapsible leak-proof cup 72 seated on the back of the head 60. The head also has a plurality of spaced ports 74 adjacent its periphery providing communications between the chamber 66 and that portion of the cylinder forward of the piston. A collapsible leak-proof cup 76 seated on the head of the piston controls the ports 74, and a spring 89 interposed between the cup and the head of the piston serves to retain the cup against displacement and also to return the piston to its retracted position.

A perforated plug 80 suitably secured in the open end of the chamber 64 has an axial bore 82, the purpose of which will hereinafter appear, and a flange 84 abutting the free end of the skirt of the piston and slidably engaging the wall of the cylinder. The flange has a plurality of spaced ports 86 providing communications between the reservoir and the annular chamber 66. A plunger 88, hereinabove referred to, mounted for reciprocation in the axial port 82, has a relatively large head 90 to which force may be applied, and a frustro-conical end 92 adapted to enter and close the axial port 68 in the head of the piston.

Slidably mounted on the plunger 88 within the chamber 64 is a piston 94 supported by a relatively heavy spring 96 interposed between the back of the piston 94 and the perforated plug 80. A leak-proof washer 98 sleeved over the plunger is seated on the head of the piston 94 and a light spring 100 interposed between the leak-proof washer and the collapsible leak-proof cup 72 on the back of the head 60 of the piston serves to retain the washer and the cup against displacement.

A shaft 102 mounted in the wall of the reservoir and extending transversely through the reservoir has keyed thereto within the reservoir an actuator 104, the free end of which engages the head 90 on the plunger 88; and keyed or otherwise secured to one end of the shaft 102 outside of the reservoir is an arm 106 connected as by a rod 108 to a foot pedal lever 110 pivoted on a suitable bracket 112 and connected by a retractile spring 114 to a fixed support 116.

Assuming that the system as herein described is installed on a motor vehicle and filled with a suitable fluid or liquid, under these conditions, upon depressing the foot pedal lever 110 force is transmitted from the lever through the rod 108, the arm 106, the shaft 102, the actuator 104 and the plunger 88 to the piston 58 resulting in moving the piston on its compression stroke.

During the initial movement of the actuator 104, the plunger 88 is moved to close the port 68 in the head of the piston, and immediately thereafter the piston is moved by the actuator to close the port 34 providing a communication between the cylinder 22 and the reservoir 10. Upon further advance of the piston the fluid in the cylinder forward of the piston is displaced therefrom and simultaneously with this displacement of the fluid a portion of the fluid in the cylinder is displaced therefrom through the ports 70 in the head of the piston into the chamber 64.

The capacity of the chamber 64 is variable, the quantity of fluid received thereby being dependent upon the pressure created in the cylinder and the tensile strength of the spring 96. The fluid received by the chamber 64 is trapped therein by the collapsible cup 72 controlling the ports 70. The metering of the fluid from the cylinder 22 to the chamber 64 cushions the force applied to the piston, and this cushioning effect is augmented by the load on the spring 96.

During the compression stroke of the piston the fluid in the cylinder 22 is displaced therefrom through the discharge port 32 and the fluid pressure delivery pipe or conduit 38 and its respective branches into the fluid pressure actuated motors 48, causing actuation of the motors attended by movement of the friction elements or shoes 54 into engagement with the braking surface of the drums 52 against the resistance of the retractile springs 56, resulting in effectively retarding rotation of the drums.

At the conclusion of the braking operation, the operator releases the foot pedal lever 110, whereupon the lever is returned to its retracted position under the influence of the retractile spring 114. As the pedal lever returns to its retracted position, the actuator 104 connected to the lever is also retracted. This results in release of the piston, whereupon the piston moves to its retracted position under the influence of the spring 78. This movement of the piston creates a partial vacuum in the cylinder forward of the head of the piston, and this results in drawing fluid from the reservoir 10 through the ports 86, the chamber 64, and the ports 74 in the head of the piston, past the cup 76 into that portion of the cylinder forward of the piston, and, simultaneously, fluid is returned to the cylinder from the pressure actuated motors 48 through the fluid pressure delivery pipe or conduit 38 and its respective branches under the influence of the retractile springs 56 connecting the friction elements or shoes 54 to the respective brakes.

When the piston returns to its fully retracted position, the pressure on the fluid in the chamber 64 acting on the frustro-conical portion of the plunger 88 moves the plunger. This movement of the plunger results in opening the port 68, whereupon a part of the fluid in the chamber 64 is displaced therefrom through the port 68 into the cylinder forward of the piston 58 by the piston 94 moving under the influence of the spring 96. This results in overfilling the cylinder 22. The fluid received by the cylinder 22 in excess of the quantity of fluid necessary to completely fill the cylinder is returned to the reservoir 10 by way of the port 32. Because of this overfilling of the cylinder any air or gas bubbles in the fluid will be conveyed by the fluid to the reservoir where they rise to the surface of the fluid in the reservoir and disperse.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. A fluid pressure producing device comprising a cylinder, a piston reciprocable therein, a variable chamber in the piston, valve mechanism for said chamber, said chamber and mechanism operative to receive fluid from that portion of the cylinder forward of the piston during the compression stroke of the piston and to return fluid to that portion of the cylinder forward of the piston upon conclusion of the retraction stroke of the piston.

2. A fluid pressure producing device comprising a reservoir, a cylinder supplied therefrom, a piston reciprocable in the cylinder, a variable chamber in the piston adapted to receive fluid from that portion of the cylinder forward of the piston during the compression stroke of the piston, means for by-passing fluid from the reservoir past the piston into that portion of the cylinder forward of the piston during the retraction stroke of the piston, and means for displacing fluid from the chamber into that portion of the cylinder forward of the piston upon conclusion of the retraction stroke of the piston.

3. A fluid pressure producing device comprising a reservoir, a cylinder supplied therefrom, a piston reciprocable in the cylinder, a chamber in the piston having ports providing communication between the chamber and that portion of the cylinder forward of the piston, means controlling the ports for movement of fluid from that portion of the cylinder forward of the piston into the chamber on the compression stroke of the piston and for movement of fluid from the chamber to that portion of the cylinder forward of the piston upon conclusion of the retraction stroke of the piston, and means for by-passing fluid from the reservoir past the piston into that portion of the cylinder forward of the piston during the retraction stroke of the piston.

4. A fluid pressure producing device comprising a reservoir, a cylinder supplied therefrom, a piston reciprocable in the cylinder having ports providing communications between the reservoir and that portion of the cylinder forward of the piston, a collapsible cup on the piston controlling the ports, a chamber in the piston having ports providing communications between the chamber and that portion of the cylinder forward of the piston, means controlling the communications, and a spring-pressed piston in the chamber operative to increase the capacity of the chamber during the compression stroke of the piston and to decrease the capacity of the chamber upon conclusion of the retraction stroke of the piston.

5. A fluid pressure producing device comprising a reservoir, a cylinder supplied therefrom, a piston reciprocable in the cylinder having ports in its head providing communications between the reservoir and that portion of the cylinder forward of the piston, a collapsible leak-proof cup on the head of the piston controlling the ports, a chamber in the piston having a concentric port and a plurality of spaced ports, a plunger controlling the concentric port, a collapsible cup on the back of the head controlling the spaced ports, a spring-pressed piston in the chamber slidable on the plunger, and means for actuating the plunger and first-named piston.

HERBERT C. BOWEN.